United States Patent [19]
Retali

[11] 3,789,623
[45] Feb. 5, 1974

[54] CENTRIFUGE MACHINE
[75] Inventor: Roger Retali, Saint Cloud, France
[73] Assignee: Fives Lille-Cail, Paris, France
[22] Filed: May 4, 1972
[21] Appl. No.: 250,361

[30] Foreign Application Priority Data
May 4, 1971 France .............................. 71.15935

[52] U.S. Cl. ........................ 64/17, 64/1 C, 64/15 B, 64/18, 64/27 L, 210/367
[51] Int. Cl. .......................................... F16d 3/26
[58] Field of Search .... 210/367, 366, 364; 34/8, 58; 64/17 R, 15 B, 27 L, 32, 15 R, 1 C, 1 V, 18

[56] References Cited
UNITED STATES PATENTS
| | | | |
|---|---|---|---|
| 874,926 | 12/1907 | Behr | 64/1 C |
| 2,931,201 | 4/1960 | Hubbard | 64/18 |
| 445,821 | 2/1891 | Rice | 64/17 R |
| 661,744 | 11/1900 | Roseberry | 64/15 R |
| 2,331,565 | 10/1943 | Patch | 210/367 |
| 2,855,474 | 10/1958 | Bohm et al. | 64/17 R |
| 3,469,417 | 9/1969 | Wakelin | 64/12 |
| 2,018,474 | 10/1935 | Tholl | 210/466 |

*Primary Examiner*—Charles J. Myhre
*Assistant Examiner*—Randall Heald
*Attorney, Agent, or Firm*—Kurt Kelman

[57] ABSTRACT

A centrifuge machine has a universal joint mounting the rotor on the rotor shaft for yielding displacement transversely of the rotor and shaft axes.

11 Claims, 6 Drawing Figures

CENTRIFUGE MACHINE

The present invention relates to improvements in centrifuge machines comprising a rotor having an axis and a rotary entrainment shaft for the rotor having an axis. More particularly, it is concerned with such machines as centrifugal driers wherein the rotor may be out of balance because of an imbalance in the charge to be dried.

As is known, an unbalanced rotor in a centrifuge causes vibrations which are transmitted to the entrainment shaft and its bearings, which may eventually lead to the breakage thereof.

Several solutions have been proposed to remedy this disadvantage, such as flexible connections between the shaft and the rotor to permit the rotor to move in relation to the shaft and to orient itself freely within certain limits. Known flexible connections include rubber sleeves or springs. Such a construction cannot be used, however, in high-capacity machines.

According to this invention, a universal joint mounts the rotor on the shaft, and the universal joint is elastically connected between the rotor and the shaft so that it may be displaced transversely in respect of the rotor and shaft axes.

In accordance with one feature of the invention, a damping device or shock absorber is provided for braking the transverse displacement of the universal joint.

In an embodiment of the present invention wherein one end of the shaft is encase while the rotor is mounted on the other end thereof, the universal joint may be a cross piece with four trunnions disposed along intersecting axes perpendicular to each other and bearings mounted on the trunnions and connected to the rotor and shaft respective by elastic leaves.

In another embodiment of this invention wherein the two ends of the shaft are supported and the rotor is mounted between the two shaft ends, the universal joint may be a collar surrounding the shaft and having a diameter exceeding that of the shaft, the collar carrying the trunnions.

Preferably, the center of the universal joint is positioned in the region of the center of gravity of the rotor.

In certain instances, it is necessary to keep the axis of the rotor fixed during some periods of operation, in which case a centering device provides a rigid connection between the shaft and the rotor when this is necessary. This device may be constituted by a male element axially displaceably mounted on the shaft and a complementary female element on the rotor for engagement with the male shaft element for unitizing the rotor and the shaft, with their axes in alignment. Under normal operating conditions, the male shaft element is retracted to permit relative motions between rotor and shaft.

The above and other objects, advantages and features of the invention will become more apparent from the following detailed description of certain now preferred embodiments thereof, taken in conjunction with the accompanying drawing wherein FIG. 1 is a side elevational view, partly in section, of a centrifugal drier according to this invention;

Figure 1:
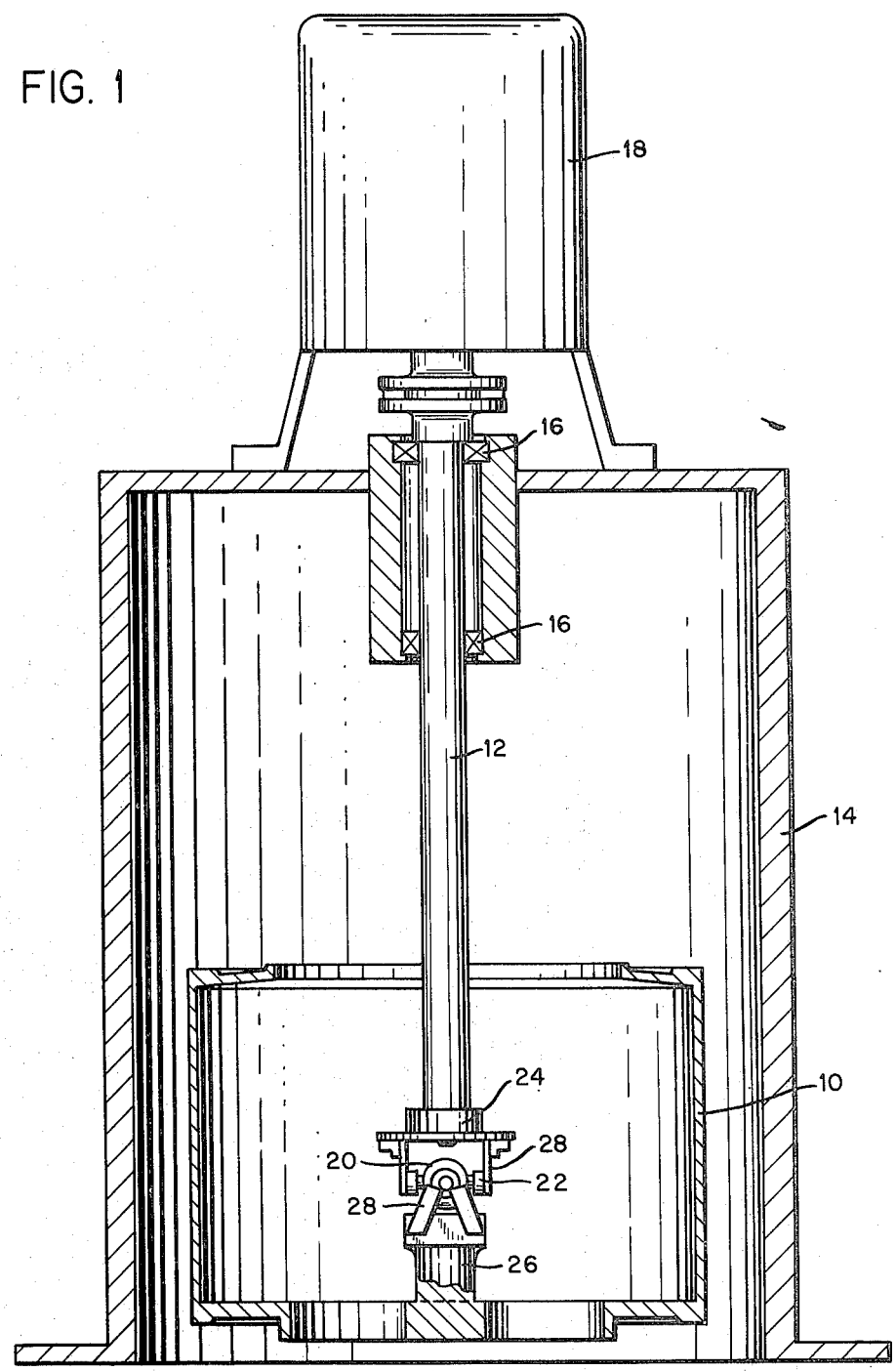

Referring now to the drawing, wherein like reference numerals designate like parts functioning in a like manner in all figures, FIG. 1 shows a centrifugal drier comprising a rotor constituted by a basket 10 mounted on the inner end of a vertical shaft 12 whose upper end is mounted on support frame 14 by means of bearings 16. The rotary shaft is entrained by motor 18 mounted on the support frame.

In accordance with the present invention, a universal joint mounts the rotor 10 on the entrainments shaft 12. The universal joint shown in FIGS. 1 and 2 comprises a cross piece 20 with four trunnions disposed along two intersecting axes perpendicular to each other. Bearing boxes 22 are mounted on the trunnions.

The two bearing boxes mounted on one pair of coaxial trunnions are connected to a platform 24 affixed to, or integral with, entrainment shaft 12 while the other two bearing boxes mounted on the pair of coaxial trunnions perpendicular to the one pair are connected to the hub 26 of the rotary basket 10.

Figure 2:
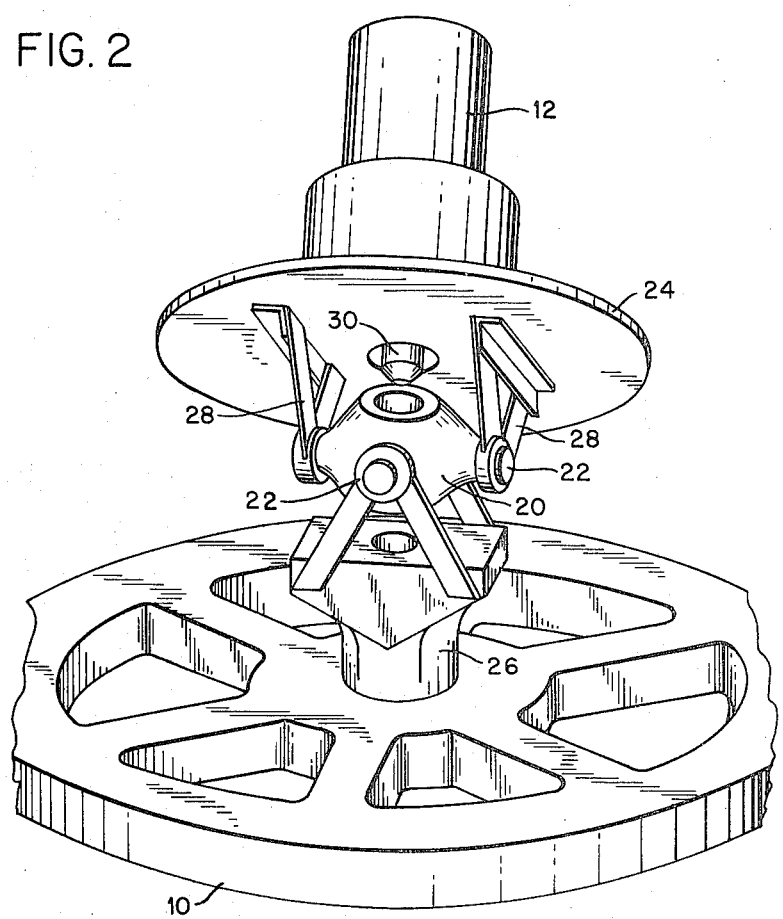
FIG. 2 is a perspective view, on an enlarged scale, of a universal joint connecting the entrainment shaft and the rotary drying basket.

The connection between each bearing box and platform 24 or hub 26, respectively, is provided by two elastic steel leaves 28 arranged in V-formation, as shown in FIG. 2.

If desired, the safety of the connection may be improved by sub-dividing each leaf into several blades in the direction of elongation of the leaf to provide a laminated leaf, each blade having the same length and thickness, and a width equal to, or exceeding, the thickness of the leaf.

Figure 3:
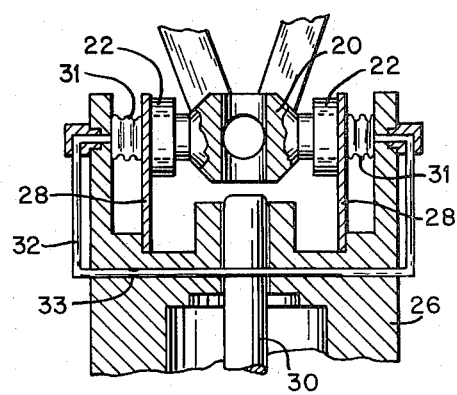
FIGS. 3 and 4 are partial views, in section, showing two modifications of a damping device between the shaft and the rotary basket.

It may be desirable to brake or absorb the vibrations of the leaves, which may appear during operation, for which purpose a damping device in the form of a hydraulic shock absorber may be associated with the leaves. In the embodiment of FIG. 3, this damping device comprises deformable capsules 31 filled with liquid and interconnected by tubing 32 of small section and having a constriction 33. The capsules are mounted between the leaves 28 and their support so that the vibrations of the leaves cause the capsules to be deformed and to displace the liquid through the tubing from one capsule to the other.

Figure 4:
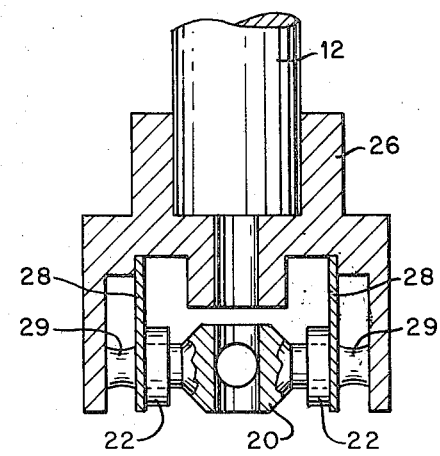

In the modification of FIG. 4, the shock absorber is constitued by rubber blocks 29 affixed to the leaves and their supports so as to restrain or brake the leaf movements.

As may be seen in FIG. 2, the shaft 12 is hollow and the axial bore of the shaft carries an axially displaceable piston rod 30 operating as a double acting jack. The universal joint cross piece 20 has a coaxial bore for receiving the piston rod when the same is downwardly displaced, the tip of the rod constituting a male element aligned with a complementary female element or recess in hub 26 of rotor 10 when the axes of the rotor 10 and the shaft 12 are in alignment. When the male and female elements are in frictional engagement, the rotary basket 10 and entrainment shaft 12 are unitized.

Figure 5:
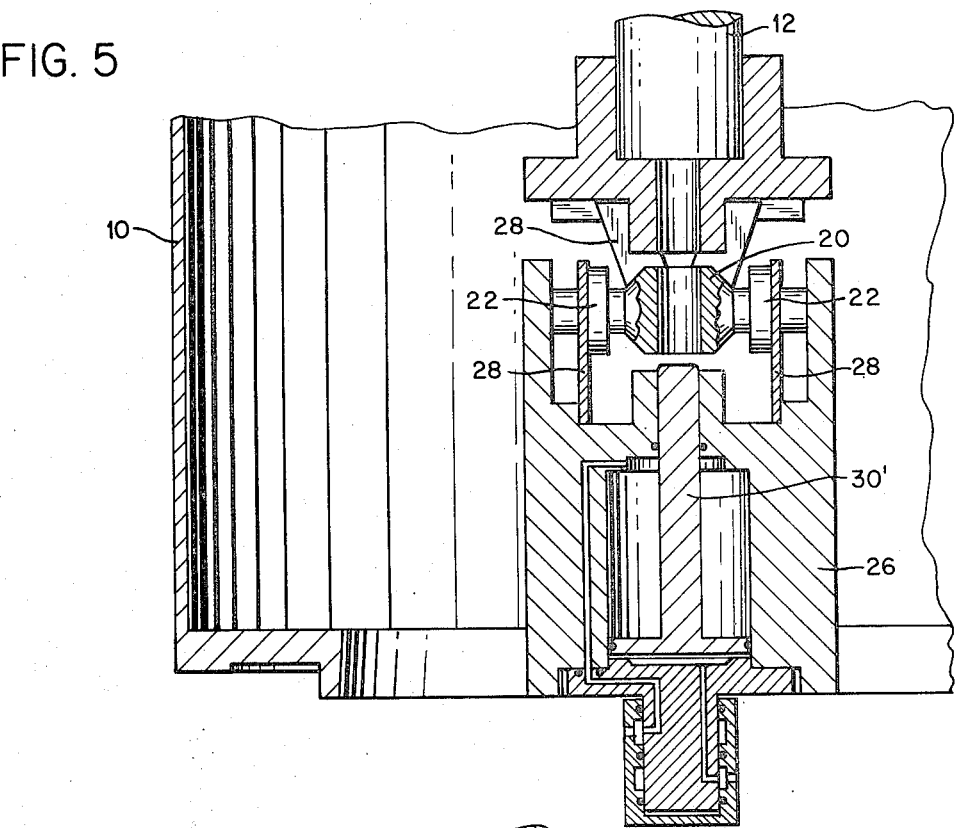
FIG. 5 is a partial view, in section, showing a centering device for the rotary basket.

Other unitizing means may be used, of course, FIG. 5, for instance, showing a piston rod 30' mounted in the rotor hub 26 for engagement with a bore in the entrainment shaft, i.e. the reverse arrangement.

Figure 6:
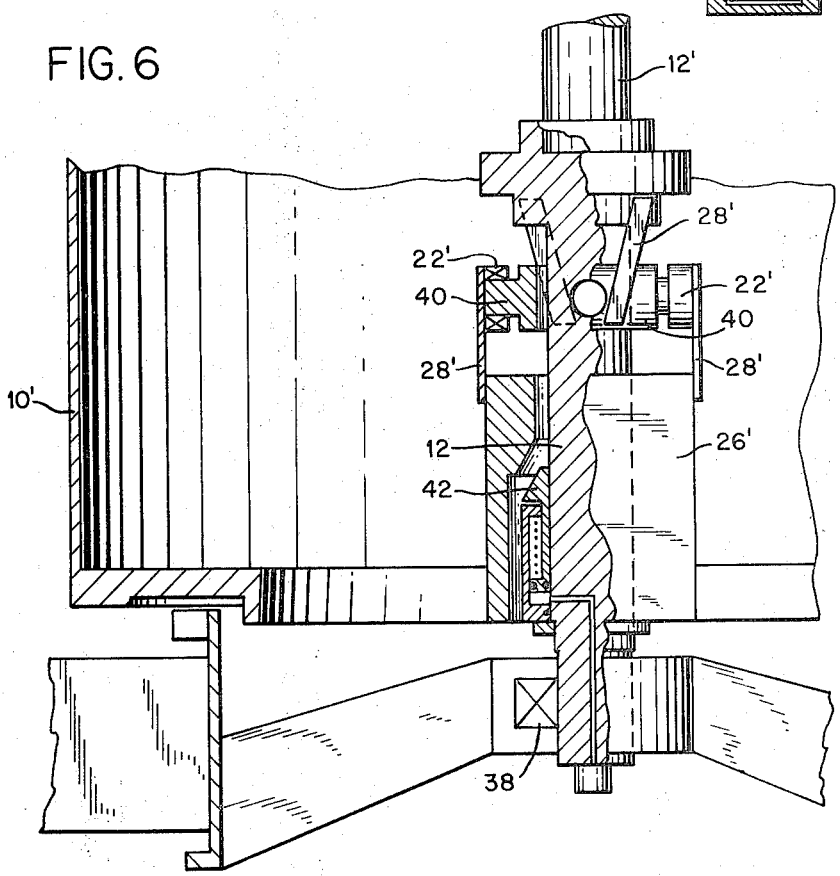
FIG. 6 is a view, partly in section and partly in elevation, showing another embodiment of the invention.

FIG. 6 illustrates an embodiment of a centrifuge machine wherein the two ends of the entrainment shaft 12' are journaled in bearings while the rotary basket 10' is mounted on the shaft between the ends thereof. In this figure, only the lower bearing 38 for the entrainment shaft has been shown, the upper end of the shaft being supported for rotation in a similar bearing.

In this embodiment, the universal joint is constituted by an annular collar 40 surrounding shaft 12' intermediate its supported ends, the inner diameter of the collar exceeding that of the shaft so that the same may be freely displaced in respect of the shaft within the built-in tolerances. Similarly to cross piece 20, the collar carries four trunnions disposed in intersecting axes perpendicular to each other, with the roller bearings 22' mounted on the respective trunnions. Again, the bearings are connected to the shaft and the rotor, respectively, by elastic leaves 28' arranged in V-formation. The hub 26' of the rotor has an axial bore receiving shaft 12'. the diameter of the hub bore being larger than that of the shaft to permit displacement of the rotary basket in respect of the shaft.

The unitizing means used in this embodiment comprises annular piston 42 gliding on shaft 12' and having a frustoconical head mating with a complementary shoulder in the bore of the rotor hub to permit the shaft and the rotor to be held in fixed, coaxial relationship when the piston is axially displaced for engagement of the complementary frusto-conical male and female elements.

The universal joint may be surrounded by a bellows of rubber or like flexible material, the respective ends of the bellows being attached respectively to the rotor hub and a flange on the shaft to form a liquid impervious chamber around the joint which may be filled with grease or any other suitable lubricant.

It will be obvious to those skilled in the art that functionally equivalent means may be used for damping the vibrations, centering the axes, etc., and that the structural principles of the described invention may be applied equally to centrifuges with a horizontal axis. The herein described universal joint between the entrainment shaft and the rotor will be particularly useful in centrifugal driers of high capacity, such as used in sugar refineries, for instance.

I claim:

1. A centrifuge machine comprising
   1. a rotor having an axis,
   2. a rotary entrainment shaft for the rotor having an axis,
   3. a universal joint mounting the rotor on the shaft, and
   4. elastic leaves connecting the universal joint to the rotor and to the shaft, respectively, for yielding displacement transversely of the rotor and shaft axes, the planes of the leaves fixing the joint to the rotor being perpendicular to the planes of the leaves fixing the joint to the shaft.

2. The centrifuge machine of claim 1, wherein each of the leaves is sub-divided into several blades in the direction of elongation of the leaves.

3. The centrifuge machine of claim 1, wherein the universal joint is constituted by a cross piece with four trunnions disposed along two intersecting axes perpendicular to each other and bearings mounted on the trunnions and connected to the rotor and shaft respectively by said leaves.

4. The centrifuge machine of claim 1, wherein the universal joint is constituted by a collar surrounding the shaft, the inner diameter of the collar exceeding the diameter of the shaft, the collar carrying four trunnions disposed along intersecting axes perpendicular to each other and bearings mounted on the trunnions and connected to the rotor and shaft respectively by said leaves.

5. A centrifuge machine comprising
   1. a rotor having an axis,
   2. a rotary entrainment shaft for the rotor having an axis,
   3. a universal joint mounting the rotor on the shaft for yielding displacement transversely of the rotor and shaft axes, and
   4. a damping device which brakes the transverse displacement.

6. A centrifuge machine comprising
   1. a rotor having an axis,
   2. a rotary entrainment shaft for the rotor having an axis,
   3. a universal joint mounting the rotor on the shaft for yielding displacement transversely of the rotor and shaft axes, and
   4. the center of the universal joint is positioned in the region of the center of gravity of the rotor.

7. A centrifuge machine comprising
   1. a rotor having an axis,
   2. a rotary entrainment shaft for the rotor having an axis,
   3. a universal joint mounting the rotor on the shaft for yielding displacement transversely of the rotor and shaft axes,
   4 a male element axially displaceably mounted on the shaft, and
   5 a complementary female element on the rotor for engagement with the male shaft element for unitizing the rotor and the shaft, with their axes in alignment.

8. The centrifuge machine of claim 5, wherein the damping device is a hydraulic shock absorber constituted by deformable capsules filled with a liquid and constricted tubing interconnecting the capsules, the transverse displacement causing deformation of the capsules.

9. The centrifuge of claim 5, wherein the damping device is constituted by rubber blocks deformable by the transverse displacements.

10. The centrifuge machine of claim 1, further comprising a male element axially displaceably mounted on the shaft and a complementary female element on the rotor for engagement with the male shaft element for unitizing the rotor and the shaft, with their axes in alignment.

11. The centrifuge machine of claim 1, further comprising a flexible sleeve surrounding the universal joint and connected respectively to the rotor and the shaft, the sleeve defining a liquid impervious chamber, and a lubricant filling the chamber.

* * * * *